United States Patent [19]  [11] 3,886,044
Inamine et al.  [45] May 27, 1975

[54] PROCESS OF MAKING CEPHAMYCIN C BY FERMENTATION

[75] Inventors: Edward Inamine, Rahway; Jerome Birnbaum, Morganville, both of N.J.

[73] Assignee: Merck & Co., Inc., Rahway, N.J.

[22] Filed: Apr. 25, 1974

[21] Appl. No.: 464,007

[52] U.S. Cl. ............................................. 195/80 R
[51] Int. Cl. ............................................. C12d 9/00
[58] Field of Search ........................... 195/80 R, 114

[56] References Cited
UNITED STATES PATENTS
3,769,169 10/1973 Birnbaum .......................... 195/80 R
3,770,590 11/1973 Inamine ............................ 195/80 R

*Primary Examiner*—Lionel M. Shapiro
*Assistant Examiner*—Robert J. Warden
*Attorney, Agent, or Firm*—Julian S. Levitt; J. Jerome Behan

[57] ABSTRACT

Increased yields of the known and useful antibiotic cephamycin C [7-(D-5-amino-5-carboxyvaleramido)-3-(carbamoyloxymethyl)-7-methoxy-3-cephem-4-carboxylic acid] are obtained by the addition of D-lysine or DL-lysine to fermentation media composed of complex organic or chemically defined nutrients.

14 Claims, No Drawings

PROCESS OF MAKING CEPHAMYCIN C BY FERMENTATION

This invention relates to an improved fermantation process for the production of the known and useful antibiotic cephamycin C [7-(D-5-amino-5-carboxyvaleramido)-3-carbamoyloxymethyl)-7-methoxy- 3-cephem-4-carboxylic acid]. [Antimicrobial Agent and Chemotherapy, Vol. 2, September 1972, pages 121-131, 132-135, 281-286 and 287-290.] In particular, this invention relates to an improved method for the production of the antibiotic by fermentation of nutrient media with suitable strains of microorganisms such as, for example, Streptomyces.

The antibiotic is produced during the aerobic fermentation of suitable aqueous nutrient media under controlled conditions. Aqueous media such as those employed for the production of other antibiotics are suitable. Such media contain sources of carbon and nitrogen which are assimilable by the microorganism, and inorganic salts. In addition, the fermentation media contain traces of metals necessary for the growth of the microorganism which are commonly supplied as impurities incidental to the other constituents of the medium. In general, carbohydrates such as sugars, for example, sucrose, maltose, fructose lactose, and the like, and starches such as grains, for example, oats and rye, corn starch, corn meal and the like can be used either alone or in combination as sources of assimilable carbon. The exact amount of the carbohydrate source or sources utilized in the medium will depend in part upon the other ingredients. It has been found, however, that an amount of carbohydrate between about 1 and 6 percent by weight of the medium is sufficient. A single carbon source may be used, or several carbon sources may be combined.

Satisfactory nitrogen sources include myriad proteinaceous materials such as various forms of hydrolysates of casein, soybean meal, corn steep liquor, distillers solubles, yeast products, tomato paste, and the like. The various sources of nitrogen can be used either alone or in combination, and are used in amounts ranging from 0.2–6 percent by weight of the aqueous medium.

The fermentation is carried out at temperatures ranging from 20°C. to 37°C., however, for optimum results, it is preferable to conduct the fermentation at temperatures of from about 24°C. to 32°C. The pH of the nutrient mediums suitable for growing the Streptomyces cultures and producing the antibiotic should be in the range of from about 6.0 to 8.0.

Cephamycin C is produced during the aerobic fermentation described above by a strain of *Streptomyces lactamdurans* and *Streptomyces clavuligerus* capable of producing said compound as, for example, by the strains on deposit in the culture collection of the Northern Utilization Research and Development Branch of the U.S. Department of Agriculture at Peoria, Ill. under accession numbers NRRL 3802 and NRRL 3585, respectively. Other strains of this species, such as mutants obtained by mutating agents or isolated from nature, can also be used.

Cephamycin C and its salts demonstrate resistance not only to penicillinase but to the cephalosporinases as well. This compound is active in inhibiting the growth of gram-positive and gram-negative microorganisms. Unlike cephalosporin C which has relatively low antibacterial activity, cephamycin C exhibits a significant in vivo gram-negative effect with a potency which, in general, is greater than cephalothin. This activity includes effectiveness against the following gram-negative bacteria: *Escherichia coli*, *Proteus vulgaris*, *Proteus mirabilis*, *Salmonella schottmuelleri*, *Klebsiella pneumoniae AD*, *Klebsiella pneumoniae B*, and *Paracolonbacterium arizonae*.

Bioassays for the anatibiotic are run by a discplate procedure using ⅜ inch filter paper discs, in accordance with the procedure described in U.S. Pat. Nos. 3,769,169 and 3,770,590, the contents of which are incorporated herein by reference. The assay plates are prepared using Difco nutrient agar plus 2.0 g./l. Difco yeast extract at 10 ml. per plate. An overnight growth of the assay organism, *Vibrio percolans* ATCC 8461 is diluted in sterile saline solution to a suspension having 40 percent transmittance at a wave length of 660 m$\mu$. This suspension is added at 20 ml./liter of medium prior to pouring the plates.

The assay plates are held at 4°C. until used (5 day maximum). Following the application of the antibiotic-saturated assay discs the plates are incubated at 28°C. for a period of from 8 to 24 hours. Zones of inhibition are read as mm. diameter. They are used to determine relative potencies or, when compared with a purified reference standard, the potency in $\mu$g./ml.

Due to the inherent difficulty in separating pure cephamycin C from the large quantities of impurities in the fermentation broth, it is of considerable importance to find a way to increase the concentration of the antibiotic relative to the total broth solids.

It is, therefore, an object of this invention to provide a method of increasing the yield of antibiotic in a fermentation process. It is a further object of the invention to provide a method of increasing the yield of an antibiotic using relatively inexpensive, readily available chemical additives in the fermentation process. Further objects of the invention will become apparent.

It has been discovered that the addition of D-lysine or DL-lysine to complex organic and chemically defined fermentation media will enchance the production of cephamycin C.

By "complex organic" media is meant media wherein some of the ingredients are not chemically defined. An example of such media is one consisting of Crescent brand oats, soybean meal, sodium citrate, a defoamer and distillers solubles. By "chemically defined" or "synthetic" media is meant media in which all of the ingredients are chemically defined. An example of such media is one consisting of glucose, potassium acid phosphate, sodium citrate, asparagine, methionine, monosodium glutamate, calcium chloride, magnesium sulfate and ferric sulfate.

The amount of the D-lysine or DL-lysine needed to stimulate production of the antibiotic is to some extent dependent upon both the culture and the medium employed. In the case of the *Streptomyces lactamdurans* or *Streptomyces clavuligerus* culture an increase in the production of the antibiotic has been observed in synthetic media containing from 0.01 to 0.80 percent (weight/volume) of either additive. Optimum yields are obtained at a level of 0.10 to 0.80 percent with particularly good yields at 0.40 percent.

Correspondingly, in a complex organic nutrient medium using *Streptomyces lactamdurans* or *Streptomyces clavuligerus*, an increase in the yields of antibiotic are observed at a level of 0.05 to 0.20 percent of D-lysine or DL-lysine, with optimum yields obtained at 0.10 to 0.20 percent.

One skilled in the art will readily appreciate that in addition to being used singly, the D-lysine and DL-lysine may be combined to afford an additive that will stimulate the yield of cephamycin C in both complex organic nutrient media and synthetic media employing either S. lactamdurans or S. clavuligerus.

One skilled in the art will further appreciate that in addition to employing D-lysine and DL-lysine, salts of these materials may be utilized in the practice of the invention. For example, the —HCl, —$SO_4$, —$PO_4$, etc. salts may be employed in the basal production medium to increase the yield of antibiotic.

The time of addition of the yield-increasing additives to the fermentation batch is not critical. Thus, the addition may take place at the time of inoculation with the Streptomyces culture to as long as 72 hours subsequent. In general, it is preferred to add the D-lysine or DL-lysine at the time of inoculation.

The media to which the D-lysine or DL-lysine compound are added can be any suitable aqueous nutrient media; however, certain media when used in combination with these additives yield particularly good amounts of the antibiotic. Thus, the *Streptomyces clavuligerus* culture has been found to afford maximum yields in the following medium:

MEDIUM I

Starch—4.8%
Distiller's Solubles—0.5%
Soya Bean Grits—0.21%
Glycerol—0.8%
Hydrolyzed Casein (*N-Z Amine, Type A)—0.5%
Ferrous Sulfate Heptahydrate—0.01%
Tap Water—1.0 liter

*N-Z Amine, Type A: an enzyme digest of casein; product of the Sheffield Chemical Co., Norwich, N.Y.

The *Streptomyces lactamdurans* culture affords especially good yields of antibiotic in Medium II infra:

MEDIUM II

Distiller's Solubles—3.0%
Primary Dried Yeast—1.0%
Mobile par-S Defoamer—0.25%
Glycine—0.05%
L-phenylalanine—0.30%
Cornstarch—2.0%
Deionized Water—1.0 liter The above discussion and examples below are primarily directed to fermentations using a particular strain of the *Streptomyces lactamdurans* and *Streptomyces clavuligerus* cultures. However, other strains of these organisms such as mutants can also be used to produce the antibiotic and it should be obvious to one skilled in the art that DL-lysine or D-lysine can be used to increase the antibiotic yield, when added to fermentation batches containing such strains. Following the teaching of this invention obvious modifications or changes in the optimal levels of the additive or the time of addition to the fermentation medium, etc., will be within the skill of the artisan, no matter which strain of *Streptomyces lactamdurans* or *Streptomyces clavuligerus* is used to produce the antibiotic cephamycin C.

Although the antibiotic is produced by both surface and submerged cultures, it is presently preferred to carry out the fermentation in the submerged state. Small scale fermentations are conveniently carried out by placing suitable quantities of nutrient medium in flasks, sterilizing the flasks and contents by heating to 120°C., inoculating the flasks with either spores or a vegetative cellular growth of a cephamycin C producing strain of Streptomyces, loosely stoppering the necks of the flasks with cotton, and permitting the fermentation to proceed at a constant temperature of about 28°C. on a shaker for 3–5 days. For larger scale work, it is preferable to conduct the fermentation in suitable tanks provided with an agitator and a means for aerating the fermentation medium. In this method, the nutrient medium is made up in the tank and sterilized by heating at 120°C. After cooling the sterilized medium is inoculated with a suitable source of vegetative cellular growth of the Streptomyces culture and the fermentation is permitted to proceed for 2–4 days while agitating and/or aerating the nutrient medium and maintaining the temperature at about 28°C. This method of producing cephamycin C is particularly suited for the preparation of large quantities of the antibiotic.

The fermentation using the cephamycin C producing microorganism can be carried out at temperatures ranging from about 20°–37°C. For optimum results, however, it is most convenient to conduct the fermentation at temperatures between 26°–30°C. The pH of the nutrient media suitable for growing the Streptomyces and producing the antibiotic may vary from about 5 to 9. The preferred pH range, however, is from about 6.0 to 7.5. In carrying out the invention, a cell suspension is prepared by the addition of sterile medium to an agar slant culture of the cephamycin C producing microorganism. Growth from the slant culture is then used to inoculate a seed flask and the seed flask is shaken at about 28°C. for 1–3 days in order to obtain good growth. The seed flask is then used to inoculate the production flasks. Alternatively, the seed flask can be inoculated from a lyophilized culture or a frozen inoculum.

The inoculation is generally carried out using about 1 ml. per 40 ml. of production medium. The desired concentration of additive is then added to the production flasks after the necessary time period of waiting and the fermentation is permitted to proceed for 2–4 days while agitating and/or aerating the nutrient medium and maintaining the temperature at about 28°C. All of the production flasks, i.e., those containing additives and the flasks used as controls, are then assayed, generally after 96 hours, to determine the amount of antibiotic produced in each flask.

The antibiotic is conveniently assayed by means of a disc-plate procedure using *Vibrio percolans* ATCC 8461 as the assay organism. Discs of 3/8 inch diameter are used. Activity of antibiotic is expressed in terms of $\mu$g. per ml. of the free acid. A standard curve is prepared from known concentration solutions of the antibiotic.

The production flasks are then assayed by diluting the sample in 0.02 molar phosphate buffer at pH 7 to an appropriate concentration. The test organism is *Vibrio percolans* ATCC 8461, and the assay medium is Difco nutrient agar plus 0.2 percent Difco yeast extract. The discs are dipped into 5 $\mu$g. per milliliter of the standard antibiotic solution and are placed on the plate in a position alternate to the sample. The plates are then incubated at 37°C. for 18 hours, and the zone diameters in millimeters are determined. Five standard plates containing 4 levels of the standard ranging from 2.5 μg./ml. to 20 μg./ml. are employed. The assay is calculated by means of a Nomograph, and the results are reported in terms of μg. per milliliter of the free acid.

The antibiotic can be recovered from the fermentation medium by a number of procedures. The filtered broth can be passed through one or more ion exchange columns. The amphoteric nature of the antibiotic enables selection of both cationic and anionic ion exchange resins to optimize recovery. The adsorbed antibiotic can then be removed by elution, preferably in a volatile solvent such as pyridine which can be easily removed.

The following examples are given for purposes of illustration and not by way of limitation.

EXAMPLE I

A lyophilized tube of S. lactamdurans NRRL 3802 was opened aseptically and its contents transferred to a slant culture tube with an agar maintenance medium of the following composition:

| | |
|---|---|
| Blackstrap molasses | 1% |
| Brewers Yeast (National Yeast Co.) | 1% |
| Bacto-Agar (Difco) | 2.5% |
| pH 7.0 | |

After inoculation the slants were incubated at 28°C. for 7 days at which time abundant growth was apparent. The cultures were stored at refrigerator temperatures until use.

First Stage Seed: A loopful of the organism from the slant culture was transferred to 40 ml. of sterile first stage seed medium contained in a 250 ml. baffled Erlenmeyer flask. The medium containing 10 g/l Primary Dried Yeast, N.F. (supplied by Yeast Products Co., Paterson, N.J.) in deionized water. The flask was incubated at 28°C. on a rotary shaker (2-inch displacement) set at 220 rpm, for 48 hours, at which time luxuriant growth of the organism was apparent.

Second Stage Seed: One ml. of the first seed was used to inoculate 40 ml. of 2 percent Fleishmann S-150 Yeast Autolysate pH 7.0 contained in a 250 ml. baffled Erlenmeyer flask. This nutrient is a product of the Fleischmann Yeast Co., Stamford, Connecticut. The second stage seed was incubated as described above for 48 hours.

Basal Production Medium: The basal production medium has the following composition:

| | g/l |
|---|---|
| Distillers Solubles (Brown & Forman Co.) | 30 |
| Primary Dried Yeast (Yeast Products Co.) | 7.5 |
| Mobil Par-S Defoamer | 2.5 |
| Sodium Thiosulfate* | 1.0 |
| Deionized water | to 1000 ml |

*Added from a sterilized concentrated stock solution at 30 hours post-inoculation.

The pH of the medium was 1 to 7.0 with small amounts of sodium hyroxide solution, dispensed (40 ml.) into 250 ml. Erlenmeyer flasks and sterilized at 120°C. for 20 minutes. After cooling the medium was inoculated with 2.5% by volume of the fermented second stage seed. The incubation was for 72 hours at 28°C. on a rotary shaker as described above. At 30 hours post-inoculation, a small quantity of sterile concentrated $Na_2S_2O_3$ solution was added to a final level of 1.0 g/l of $Na_2S_2O_3$.

To a series of flasks, prepared as described above, was added L-, D-, or DL-lysine.HCl. The flasks were identical in every way except for the presence of the amino acid. The lysine solution was prepared by dissolving L-, D- or DL-lysine.HCl in water and neutralizing to pH 7.0 with sodium hydroxide solution. These solutions were sterilized separately from the basal production medium, and aliquots were added first prior to inoculation with the production organism to give a final concentration of 0.1 percent in the case of L- and D-lysine and 0.2 percent in the case of DL-lysine.

Upon completion of the fermentation the cells were removed by centrifugation and the clarified broth assayed for cephamycin C in the manner discussed above.

TABLE 1

| Additions to Basal Production Medium | Conc. (Calc. as Hydrochloride) | Cephamycin C Production (μg/ml) |
|---|---|---|
| None (control) | 0 | 185 |
| D-lysine | 0.10% | 266 |
| DL-lysine | 0.20% | 299 |
| L-lysine | 0.10% | 150 |

EXAMPLE II

First Seed Stage: A lyophilized tube of S. lactamdurans NRRL 3802 was opened aseptically and its contents transferred to 40 ml. of sterile first stage seed medium contained in a 250 ml. baffled Erlenmeyer flask. The medium contained 10 g/l Primary Dried Yeast, N.F (supplied by Yeast Products Co., Paterson, N.J.) in deionized water. The flask was incubated at 28°C. on a rotary shaker (2-inch displacement) set at 220 rpm, for 48 hours, at which time luxuriant growth of the organism was apparent.

Second Stage Seed: One ml. of the first seed was used to inoculate 40 ml. of medium containing 1 percent Ardamine YEP Yeast Autolysate (Yeast Products Co., N.J.) at pH 7.0, in a 250 ml. baffled Erlenmeyer flask. Incubation was on a rotary shaker (2-inch displacement, 220 rpm) at 28°C. for 22 hours.

Basal Production Medium: The basal production medium has the following composition:

| | (%) |
|---|---|
| Distillers Solubles | 3.0 w/v |
| Primary Dried Yeast N.F. | 0.75 w/v |
| Cornstarch (Clinton) | 2.0 w/v |
| Dimethylformamide | 1.0 v/v |
| Glycine | 0.05 w/v |
| L-phenylalanine | 0.3 w/v |
| Mobil Par S-Defoamer | 0.25 w/v |
| Sodium Thiosulfate* | 0.1 w/v |

*Added at 30 hours post-inoculation from a sterile concentrated stock solution to give the final concentration as shown.

The medium was made up in deionized water, adjusted to pH 7-7.5 with sodium hydroxide, dispensed (40 ml.) into 250 ml. Erlenmeyer flasks and sterilized by autoclaving for 20 minutes. After cooling the medium was inoculated with 2.5 percent by volume of the second stage seed and incubated for 96 hours at 28°C. on a rotary shaker (2-inch displacement) set at 220 rpm. The sodium thiosulfate was added at 30 hours post-inoculation.

To a series of flasks, prepared as described above, was added L-, D-, or DL-lysine.HCl. The flasks were identical in every way except for the presence of the amino acid. The lysine solution was prepared by dissolving L-, D- or DL-Lysine.HCl in water and neutralizing to pH 7.0 with sodium hydroxide solution. These solutions were sterilized separately from the basal production medium, and aliquots were added first prior to inoculation with the production organism to give a final concentration of 0.05 to 0.2 percent of L-, D-, or DL-Lysine hydrochloride.

Upon completion of the fermentation the cells were removed by centrifugation and the clarified broth assayed for cephamycin C in the manner described above.

TABLE 2

| Addition to the Basal Production Medium | Conc. (Calc. as Hydrochloride) | Cephamycin C Production (μg/ml) |
| --- | --- | --- |
| None (Control) | 0 | 131 |
| D-lysine | 0.05% | 186 |
|  | 0.10% | 184 |
|  | 0.20% | 237 |
| DL-lysine | 0.05% | 169 |
|  | 0.10% | 157 |
|  | 0.20% | 187 |
| L-lysine | 0.05% | 97 |
|  | 0.10% | 96 |
|  | 0.20% | 88 |

EXAMPLE III

First Seed Stage: A lyophilized tube of *S. lactamdurans* NRRL 3802 was opened aseptically and its contents transferred to 40 ml. of sterile first stage seed medium contained in a 250 ml. baffled Erlenmeyer flask. The medium contained 10 g/l Primary Dried yeast, N.F. (supplied by Yeast Products Co., Paterson, N.J.) in deionized water. The flask was incubated at 28°C. on a rotary shaker (2-inch displacement) set at 220 rpm, for 48 hours, at which time luxuriant growth of the organism was apparent.

Second Stage Seed: One ml. of the first seed was used to inoculate 40 ml. of medium containing 1 percent Ardamine YEP yeast Autolysate (Yeast Products Co., N.J.) at pH 7.0, in a 250 ml. baffled Erlenmeyer flask. Incubation was on a rotary shaker (2-inch displacement, 220 rpm) at 28°C. for 22 hours.

Basal Production Medium: The basal production medium has the following composition:

|  | (%) |
| --- | --- |
| Distillers Solubles | 3.0 w/v |
| Primary Dried Yeast N.F. | 0.75 w/v |
| Glycerol | 1.0 w/v |
| Dimethylformamide | 1.0 v/v |
| Glycine | 0.05 w/v |
| L-phenylalanine | 0.3 w/v |
| Mobil Par S-Defoamer | 0.25 w/v |
| Sodium Thiosulfate* | 0.1 w/v |

*Added at 30 hours post-inoculation from a sterile concentrated stock solution to give the final concentration as shown.

The medium was made up in deionized water, adjusted to pH 7-7.5 with sodium hydroxide, dispensed (40 ml.) into 250 ml. Erlenmeyer flasks and sterilized by autoclaving for 20 minutes. After cooling the medium was inoculated with 2.5 percent by volume of the second stage seed and incubated for 96 hours at 28°C. on a rotary shaker (2-inch displacement) set at 220 rpm. The sodium thiosulfate was added at 30 hours post-inoculation.

To a series of flasks, prepared as described above, was added L-, D-, or DL-lysine.HCl. The flasks were identical in every way except for the presence of the amino acid. The lysine solution was prepared by dissolving L-, D- or DL-lysine.HCl in water and neutralizing to pH 7.0 with sodium hydroxide solution. These solutions were sterilized separately from the basal production medium, and aliquots were added first prior to inoculation with the production organism to give final concentrations of 0.05 percent to 0.2 percent of L-, D-, or DL-Lysine hydrochloride.

Upon completion of the fermentation the cells were removed by centrifugation and the clarified broth assayed for cephamycin C in the manner discussed above.

TABLE 3

| Addition to the Basal Production Medium | Conc. (Calc. as Hydrochloride) | Cephamycin C Production (μg/ml.) |
| --- | --- | --- |
| None (Control) | 0 | 151 |
| D-lysine | 0.05% | 221 |
|  | 0.10% | 274 |
|  | 0.20% | 296 |
| DL-lysine | 0.05% | 182 |
|  | 0.10% | 198 |
|  | 0.20% | 222 |
| L-lysine | 0.05% | 152 |
|  | 0.10% | 143 |
|  | 0.20% | 120 |

EXAMPLE IV

First Seed Stage: A lyophilized tube of *S. lactamdurans* NRRL 3802 was opened aseptically and its contents transferred to 40 ml. of sterile first stage seed medium contained in a 250 ml. baffled Erlenmeyer flask. The medium contained 10 g/l Primary Dried Yeast, N.F. (supplied by Yeast Products Co., Paterson, N.J.) in deionized water. The flask was incubated at 28°C. on a rotary shaker (2-inch displacement) set at 220 rpm, for 48 hours, at which time luxuriant growth of the organism was apparent.

Second Stage Seed: One ml. of the first seed was used to inoculate 40 ml. of synthetic medium which was identical to the synthetic production medium described below. Incubation was in Erlenmeyer flasks at 28°C. on a rotary shaker (2-inch displacement) set at 220 rpm for 48 hours.

| Synthetic Production Medium: | (%) |
| --- | --- |
| Glucose | 1.0 |
| Monosodium glutamate | 0.425 |
| i-Inositol | 0.02 |
| p-Aminobenzoic acid | 0.000001 |
| $K_2HPO_4$ | 0.2 |
| $NH_4Cl$ | 0.1 |
| NaCl | 0.05 |
| $MgSO_4.7H_2O$ | 0.05 |
| $CaCO_3$ | 0.025 |
| $FeSO_4.7H_2O$ | 0.0025 |
| $ZnSO_4.7H_2O$ | 0.001 |
| $MnSO_4.H_2O$ | 0.0005 |
| $Na_2S_2O_3$* | 0.1 |

*Added from a sterile concentrated stock solution at 30 hours post-inoculation to give the final concentration as shown.

The medium was prepared with deionized water and adjusted to pH 7.0 with sodium hydroxide and 250 ml. Erlenmeyer flasks containing 40 ml. each of the medium were sterilized by autoclaving for 20 minutes.

After cooling each flask was inoculated with 1.0 ml. of the second seed. Incubation was for 96 hours at 28°C. on a rotary shaker. The sodium thiosulfate was added as described above at 30 hours after inoculation. L-, D- or DL-lysine.HCl was added to the flasks from separately sterilized stock solutions just prior to inoculation with the organism in order to give several levels of the amino acid. Assays of antibiotic production were performed as described previously.

TABLE 4

| Additions to the Basal Synthetic Production Medium | Conc. (Calc. as Hydrochloride) | Cephamycin C Production (μg/ml.) |
| --- | --- | --- |
| None (Control) | 0 | 80 |
| D-lysine | 0.01% | 102 |
|  | 0.10% | 180 |
|  | 0.20% | 219 |
|  | 0.40% | 270 |
|  | 0.80% | 251 |
| DL-lysine | 0.01% | 113 |
|  | 0.10% | 140 |
|  | 0.20% | 129 |
|  | 0.40% | 148 |
|  | 0.80% | 166 |
| L-lysine | 0.01% | 68 |
|  | 0.10% | 112 |
|  | 0.20% | 65 |
|  | 0.40% | 83 |
|  | 0.80% | 95 |

EXAMPLE V

Seed Stage: A lyophilized tube of *Streptomyces clavuligerus* NRRL 3585 was opened aseptically and its contents transferred into 40 ml. of a medium with the following composition:

|  | (%) |
| --- | --- |
| Glucose | 1.5 |
| Soya Bean Meal | 1.5 |
| Corn Steep Liquor Solids | 0.5 |
| Calcium Carbonate | 0.2 |
| Sodium Chloride | 0.5 |
| Deionized Water | to 1000 ml. |

The pH of the solution was adjusted to 6.7 with sodium hydroxide, dispensed (40 ml.) into 250 baffled Erlenmeyer flasks and sterilized at 120°C. for 20 minutes. The inoculated flask was incubated at 28°C. on a rotary shaker (2-inch displacement) set at 220 rpm for 48 hours, at which time heavy growth of the organism was apparent.

Basal Production Medium: The basal production medium has the following composition:

|  | (%) |
| --- | --- |
| Cornstarch (Clinton Corn Products) | 4.8 |
| Distillers Solubles | 0.5 |
| Soya Bean Meal | 0.1 |
| Glycerol | 0.8 |
| Hydrolyzed Casein (N-Z-Amine,Type A) | 0.5 |
| Ferrous Sulfate Heptahydrate | 0.01 |
| Sodium Thiosulfate* | 0.05 |
| Tap Water | to 1000 ml. |

*Added at start of fermentation from a sterile concentrated stock solution to give the final concentration shown.

The solution was adjusted to pH 6.5 with sodium hydroxide, dispensed (40 ml.) into 250 ml. Erlenmeyer flasks and sterilized for 20 minutes at 120°C. After cooling the medium, sodium thiosulfate was added as described above and the flasks were inoculated with 2.5 percent by volume of the seed stage. The incubation was for 96 hours at 28°C. on a rotary shaker as described above.

As in Example IV above, several flasks received either D- or DL-lysine.HCl. The production of antibiotic was assayed as described previously.

TABLE 5

| Addition to the Basal Production Medium | Conc. (Calc. as Hydrochloride) | Production Cephamycin C Equivalents (μg/ml) |
| --- | --- | --- |
| None (Control) | 0 | 663 |
| D-Lysine | 0.05% | 771 |
|  | 0.10% | 848 |
| DL-Lysine | 0.05% | 784 |
|  | 0.10% | 765 |

It is readily apparent from a consideration of Examples 1-5 that D-lysine and DL-lysine dramatically stimulate the antibiotic production of cephamycin C, whereas L-lysine does not. In fact, the L-lysine may conceivably be considered as slightly inhibitory when added to complex production media at the higher levels. The stimulation of the production of the β-lactam antibiotic cephamycin C by the "unnatural" amino acids D- and DL-lysine is a unique and unexpected phenomenon.

Any departure from the above description which conforms to the present invention is intended to be included within the scope of the claims.

What is claimed is:

1. In the process for preparing cephamycin C by growing a cephamycin C producing specie of Streptomyces in a nutrient medium, the improvement which comprises the addition of D-lysine or DL-lysine to the nutrient medium.

2. The process of claim 1 wherein the Streptomyces specie is selected from the group consisting of *Streptomyces lactamdurans* or *Streptomyces clavuligerus*.

3. The process of claim 2 wherein the nutrient medium is a complex organic nutrient medium.

4. The process of claim 3 wherein the D-lysine or DL-lysine is added in the amount of from about 0.05 to 0.20 percent (weight/volume) of the complex organic nutrient media, calculated as the hydrochloride.

5. The process of claim 4 wherein the organism is *Streptomyces lactamdurans*.

6. The process of claim 4 wherein the organism is *Streptomyces clavuligerus*.

7. The process of claim 4 wherein the additive is D-lysine.

8. The process of claim 4 wherein the additive is DL-lysine.

9. The process of claim 2 wherein the nutrient medium is synthetic.

10. The process of claim 9 wherein the D-lysine or DL-lysine is added in the amount of from about 0.01 to 0.80 percent (weight/volume) of the synthetic media, calculated as the hydrochloride.

11. The process of claim 10 wherein the organism is *Streptomyces lactamdurans*.

12. The process of claim 10 wherein the organism is *Streptomyces clavuligerus*.

13. The process of claim 10 wherein the additive is D-lysine.

14. The process of claim 10 wherein the additive is DL-lysine.

* * * * *